(12) United States Patent
Mueller et al.

(10) Patent No.: US 6,481,721 B1
(45) Date of Patent: Nov. 19, 2002

(54) METHOD AND APPARATUS FOR OVERCLADDING A GLASS ROD

(75) Inventors: Peter Michael Mueller, Suwanne; Srinivas Vemury, Duluth, both of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/353,943

(22) Filed: Jul. 15, 1999

(51) Int. Cl.[7] .............................. F16J 15/32; F16J 15/02
(52) U.S. Cl. ...................... 277/549; 277/560; 277/570; 277/630; 277/637; 277/644; 277/913
(58) Field of Search ................................ 277/549, 500, 277/570, 572, 630, 634, 637, 644, 602, 607, 913; 65/385, 391

(56) References Cited

U.S. PATENT DOCUMENTS

| | | | |
|---|---|---|---|
| 3,917,292 A | * 11/1975 | Martin | |
| 3,998,245 A | * 12/1976 | Martin | |
| 4,217,027 A | 8/1980 | MacChesney et al. | ..... 350/96.3 |
| 4,356,700 A | * 11/1982 | Eckels et al. | |
| 4,477,244 A | 10/1984 | Nis et al. | ..................... 432/11 |
| 4,488,406 A | * 12/1984 | Eckels | |
| 4,775,401 A | 10/1988 | Fleming et al. | ............... 65/3.11 |
| 4,820,322 A | 4/1989 | Baumgart et al. | ............ 65/3.11 |
| 4,869,743 A | * 9/1989 | Fitoussi et al. | |
| 5,044,724 A | 9/1991 | Glodis et al. | ................ 385/127 |
| 5,113,035 A | * 5/1992 | Wittmann et al. | |
| 5,221,306 A | 6/1993 | Fleming, Jr. et al. | ............. 65/2 |
| 5,578,724 A | 11/1996 | Fleming, Jr. et al. | .......... 65/391 |
| 6,293,557 B1 | * 9/2001 | Mueller | ..................... 277/551 |

* cited by examiner

Primary Examiner—Anthony Knight
Assistant Examiner—Vishal Patel
(74) Attorney, Agent, or Firm—Thomas, Kayden, Horstemeyer & Risley LLP

(57) ABSTRACT

A method and apparatus for maintaining the pressure in an overclad tube at a reduced level despite axial movement of the tube during performance of an RIT overcladding operation. The overcladding tube is held by means of the lathe chuck, and a tubular extension of a rotary union member extends into the tube. The distal end of the extension has a sealing member replaceably mounted thereon which forms a seal with the interior wall of the tube. A vacuum source thus is enabled to connect to the interior of the overcladding tube through the rotary union, the extension tube, and the seal.

12 Claims, 5 Drawing Sheets

<u>PRIOR ART</u>

TO VACUUM PUMP

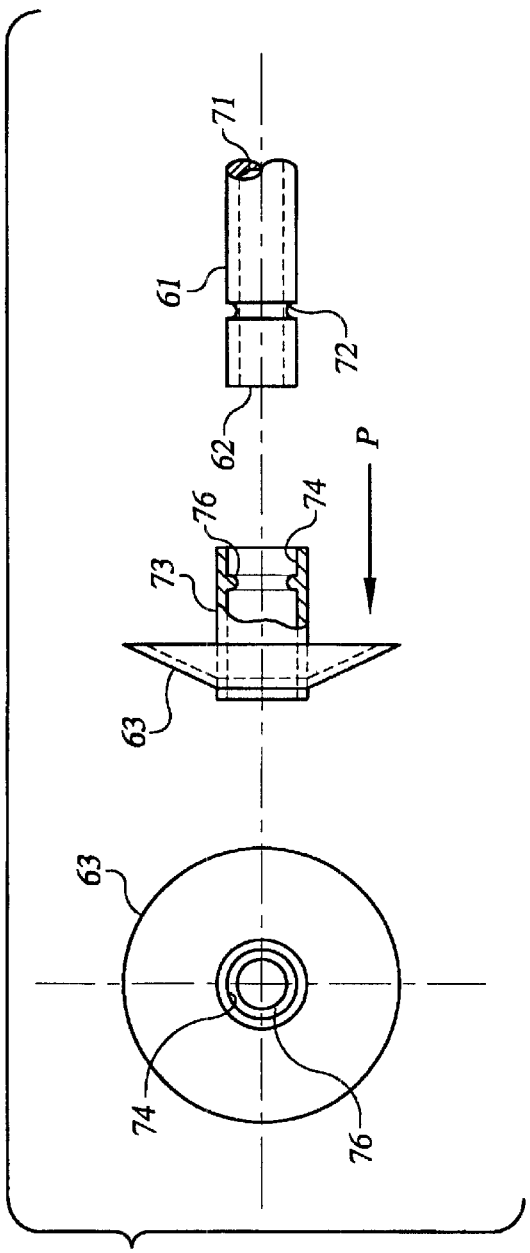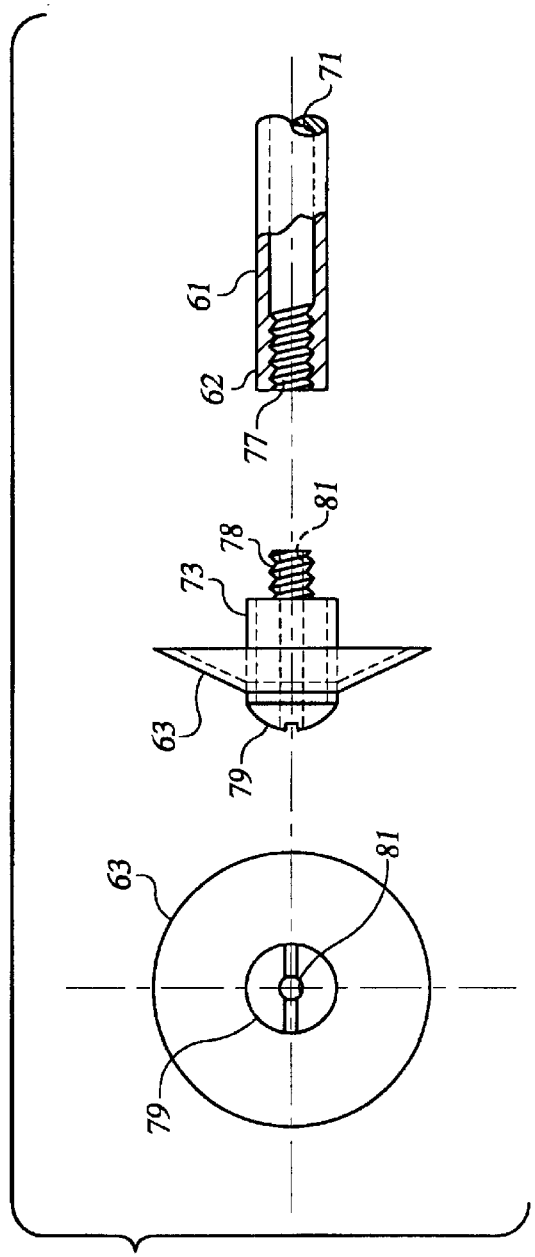

METHOD AND APPARATUS FOR OVERCLADDING A GLASS ROD

FIELD OF THE INVENTION

This invention relates to methods of and apparatus for overcladding a glass rod. More particularly, this invention relates to methods and apparatus for causing a glass tube to be collapsed onto a glass rod to provide an optical fiber preform.

BACKGROUND OF THE INVENTION

Optical fiber of the type used to carry optical signals is fabricated typically by heating and drawing a portion of an optical preform comprising a refractive core surrounded by a protective glass cladding. Presently, there are several known processes for fabricating preforms. The modified chemical vapor deposition (MCVD) process, which is described in U.S. Pat. No. 4,217,027 issued in the names of J. B. MacChesney et al. on Aug. 12, 1980 and assigned to Bell Laboratories, Inc. has been found to be one of the most useful because the process enables large scale production of preforms which yield very low loss optical fiber.

During the fabrication of preforms by the MCVD process, reactant-containing gases, such as $SiCl_4$ and $GeCl_4$ are passed through a rotating substrate tube which is made of silica glass. A torch heats the tube from the outside as the precursor gases are passed therethrough, causing deposition of submicron-sized glass particles on the inside surface of the tube. The torch is moved along the longitudinal axis of the tube in a plurality of passes to build up layer upon layer of glass to provide a preform tube. Once a sufficient number of layers have been deposited, the preform tube is then heated to cause it to be collapsed to yield a preform or preform rod as it is often called.

One way in which the productivity of the MCVD process can be increased is first to produce an undercladded preform, having a larger than desired core-to-cladding mass ratio. The preform is inserted into a glass tube which is referred to as an overcladding tube and which is then collapsed onto the preform. This process is referred to as the rod in tube technique, or RIT.

At the present time, production methods of manufacturing overclad preforms are usually performed on a vertical lathe, with a vacuum arrangement attached to the lower headstock of the lathe. The lower headstock of the lathe has a chuck mounted thereon attached to a spindle which provides rotary motion. There is no relative motion between the chuck and the vacuum arrangement. A heating member, such as an oxyhydrogen torch, is made to travel along the length of the rod with the overcladding tube surrounding it to soften the tube and collapse it about the rod. The vacuum arrangement creates a low pressure or vacuum to provide a pressure bias to the tube to aid in its collapse, and, also, to remove possible contaminants that may have been interjected into the space between the rod and the tube prior to the collapse of the latter. Such a vacuum arrangement, including the apparatus for generating the vacuum, severely limits the length of the overclad preform product, thereby inhibiting the use of enhanced production techniques which require, for example, longer preforms.

One widely used vacuum apparatus comprises a hollow circular cavity concentric with the spindle centerline of rotation, the bottom of the cavity being perpendicular to the centerline or axis of rotation. The top of the cavity is open to the atmosphere. The cavity diameter may be appropriately sized to allow for various tube diameters to be inserted. The closed end of the cavity has an axial bore therein to link to a rotary union member which is attached to the vacuum structure. As a consequence, a vacuum source may be supplied in the stationary reference frame of the lathe and linked to the cavity which rotates when the headstock or tailstock spindle is rotating. A cylindrical insert is placed inside of the cavity, having a diameter roughly equal to the cavity interior diameter. This insert has a lower surface parallel to the bottom of the cavity and rests on the bottom thereof. The upper surface is also parallel to the bottom of the cavity and has a washer of refractory material mounted thereon. Both the insert and the washer have a central or axial hole extending therethrough which allow routing of the vacuum source to the upper surface, while the lower surface of the insert forms a mechanical seal with the cavity. There may be some leakage in this sealing arrangement, however, it is generally insufficient to necessitate aborting the operation.

The end of the overclad tube, which has been prepared, as by grinding, to be perpendicular to its cylindrical axis, rests on the refractory washer surface, forming a seal therewith, which may have some leakage. The washer thus functions as an axial position spacer and as a face seal between the overclad tube and the insert. The vacuum source, with this arrangement, is thus routed to the interior of the overclad tube. Once the tube has been positioned with its own weight exerting the sealing force on the refractory washer, the jaws of the lathe chuck are closed so that the tube is clamped rotationally and axially in position and the vacuum is transferred through the rotary union to the interior of the overclad tube. The tube cannot be moved axially for repositioning without breaking the seal. Thus, the span between the headstock and the tailstock of the lathe, at maximum separation, imposes a limit on the combined length of the rod to be inserted in the tube and the tube itself. This, in turn, limits the length of the preform product, thereby limiting the production process and preventing enhancement thereof or any increase in preform length. In addition, the heating element can only apply the desired heat to a limited length of rod-in-tube which represents a further limitation on the length of the finished preform. Any axial adjustments or relative movement of the rod and the tube are also prevented, or, at least, limited.

It is desirable, therefore, that such limitation on the length of the preform be eliminated, or at least reduced so that, in accordance with enhanced production, longer preforms may be produced.

SUMMARY OF THE INVENTION

The present invention is a sealing arrangement that, in effect, eliminates dependency upon the sealing interface between the heretofore used insert and the bottom of the cavity and the sealing interface between the end of the tube and the refractory washer by eliminating both the insert and the washer, and thereby making axial adjustment feasible. As a consequence, as will be seen more clearly hereinafter, the length of the tube within the rod portion can be measurably increased with the net result that longer preforms are created.

In greater detail, the longitudinal stem of the rotary union, at its distal end, has a disposable seal mounting hub interface. A disposable resilient sealing member of suitable material, such as Teflon® or hard rubber, for example, is fastened to the distal end of the stem at the hub interface. The sealing member has an outside diameter that is a sealing fit within the internal diameter of the tube. By "sealing fit" is meant a fit sufficiently tight to constitute a substantially hermetic seal but not so tight that the tube cannot be axially moved relative thereto. Some leakage at the seal may occur, but as the vacuum or pressure differential increases, so too does the sealing capability of the seal.

As the overclad tube is lowered into the cavity, the seal system is engaged and vacuum application can start as soon as the engagement of the sealing member, with the ID (inner diameter) of the tube takes place. The tube can then be axially positioned as required without engagement for sealing purposes of the end thereof. If the tailstock (or headstock) of the lathe has a pass through bore, it can be appreciated that a tube of greater length than has heretofore been possible may be used, which may be moved axially to bring more tube length into the heating region without destroying the vacuum seal. The chuck of the lathe headstock or tailstock is used to clamp the tube in place, and may be loosened to allow moving of the tube axially and then reclamped. The rotary union, which has its rotating portion connected to the sealing member and its stationary portion connected to the vacuum apparatus, is dependent upon the friction between the sealing member and the tube for driving the rotating portion as the tube is rotated. With a tight seal, the rotation of the tube is transmitted to the rotary union substantially without slippage and the seal remains intact. Alternatively, the tightness of the seal can be such that the tube rotates with respect to the sealing member without compromising the seal. Adjustments can be made to select any combination between these two extremes, such as stationary (seal within the tube) wherein the rotary portion rotates, combination seal/rotary union rotation, or seal only rotation (relative to the tube). The amount of leakage and vacuum properties of the seal will necessarily vary depending upon which option is chosen, or which is caused by environmental or production line conditions, without destroying the integrity of the seal.

With the structure of the invention as hereinbefore described, axial movements and adjustments between the rod and the seal can be made without destroying the vacuum seal, thereby making possible considerable production enhancement, such as much longer preforms, than heretofore achievable.

DESCRIPTION OF THE DRAWINGS

FIG. 5 illustrates one arrangement for mounting the sealing member to th extension tube of the rotary union; and FIG. 6 illustrates a second arrangement for mounting the sealing member on the extension tube.

DETAILED DESCRIPTION

Figure 1:
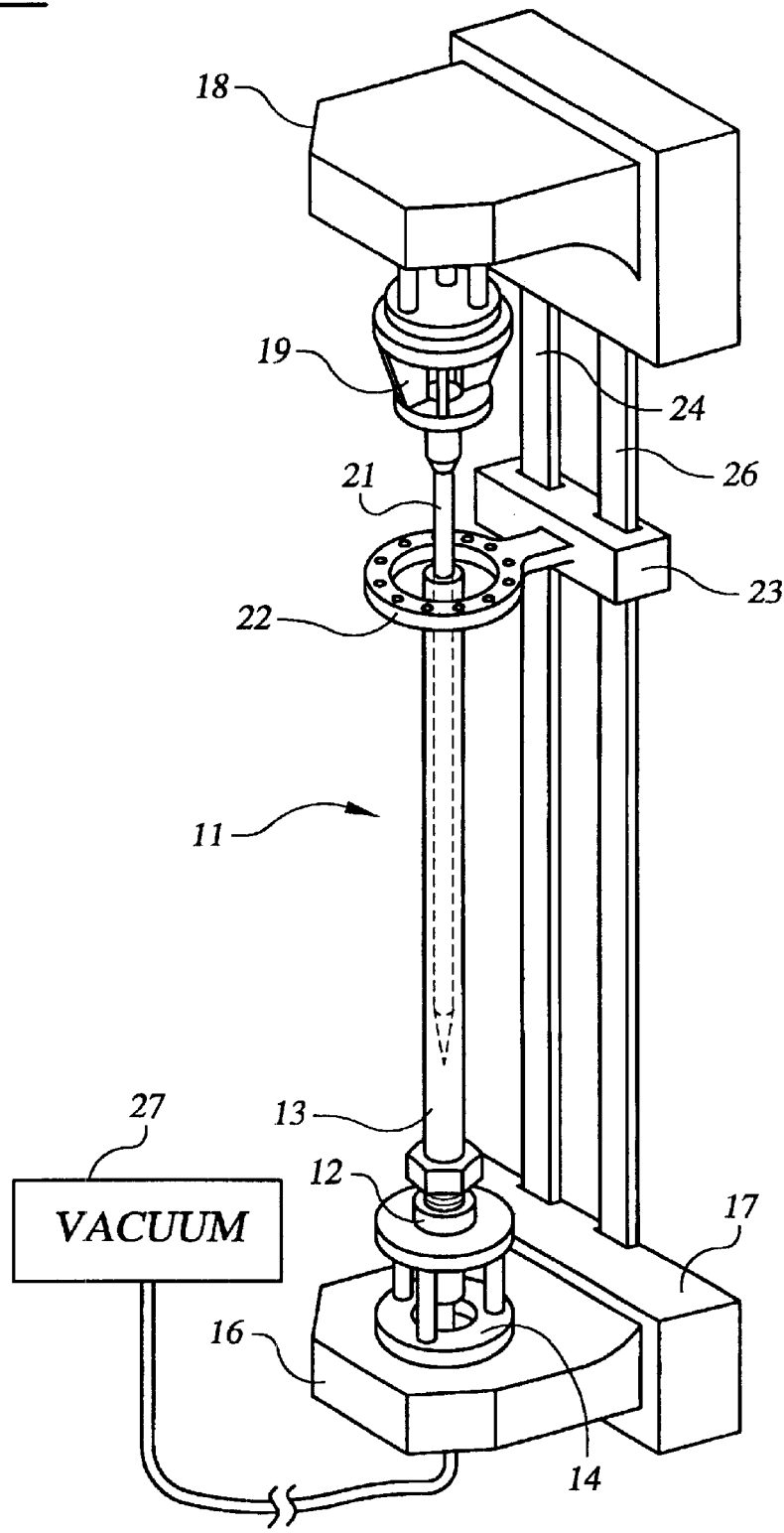
FIG. 1 is a perspective view of the vertical latch overcladding arrangement of the prior art.

FIG. 1 is a perspective view of a generally used apparatus 11 for overcladding a rod by means of the rod-in-tube process. Arrangement 11 comprises a chuck 12 in which is mounted the overclad tube 13 with its longitudinal axis extending vertically. Chuck 12 is mounted in a holder 14 supported on the tailstock 16 of a vertical lathe frame 17. The headstock 18 of the lathe frame 17 has a chuck 19 in which is mounted the preform rod 21, which is inserted axially into tube 13. It can be seen that the maximum spacing between the tailstock 16 and the headstock 18 limits the sum of the lengths of the tube 13 and the rod 21. The headstock 18 and tailstock 16 are axially movable relative to each other so that the rod 21 may be inserted into the tube 13 over a large portion of its length. In the apparatus shown in FIG. 1, both the rod 21 and the tube 13 are driven by the headstock 18 and the tailstock 16 to rotate about their aligned rotational axes. A plasma torch 22 is mounted on a carrier 23 which, in turn, is mounted on rails 24 and 26 for movement parallel to the axis of rotation of tube 13 and rod 21. The apparatus as thus far described is similar to those shown in U.S. Pat. No. 4,217,027 of McChesney et al. and U.S. Pat. No. 4,477,244 of Nis et al., and U.S. Pat. No. 5,221,306 which are incorporated herein by reference.

The plasma torch 22 applies heat to the tube 13 and rod 21 while they are rotating, sufficient to cause tube 13 to collapse around rod 21 in a manner well known in the art. In order that a bias for aiding the collapse be applied, a vacuum source 27 is used to create a low pressure area between the tube 13 and the rod 21. This has, as pointed out hereinbefore, the additional benefit of removing contaminants that may be in the space between the rod 21 and the tube 13.

Figure 2:
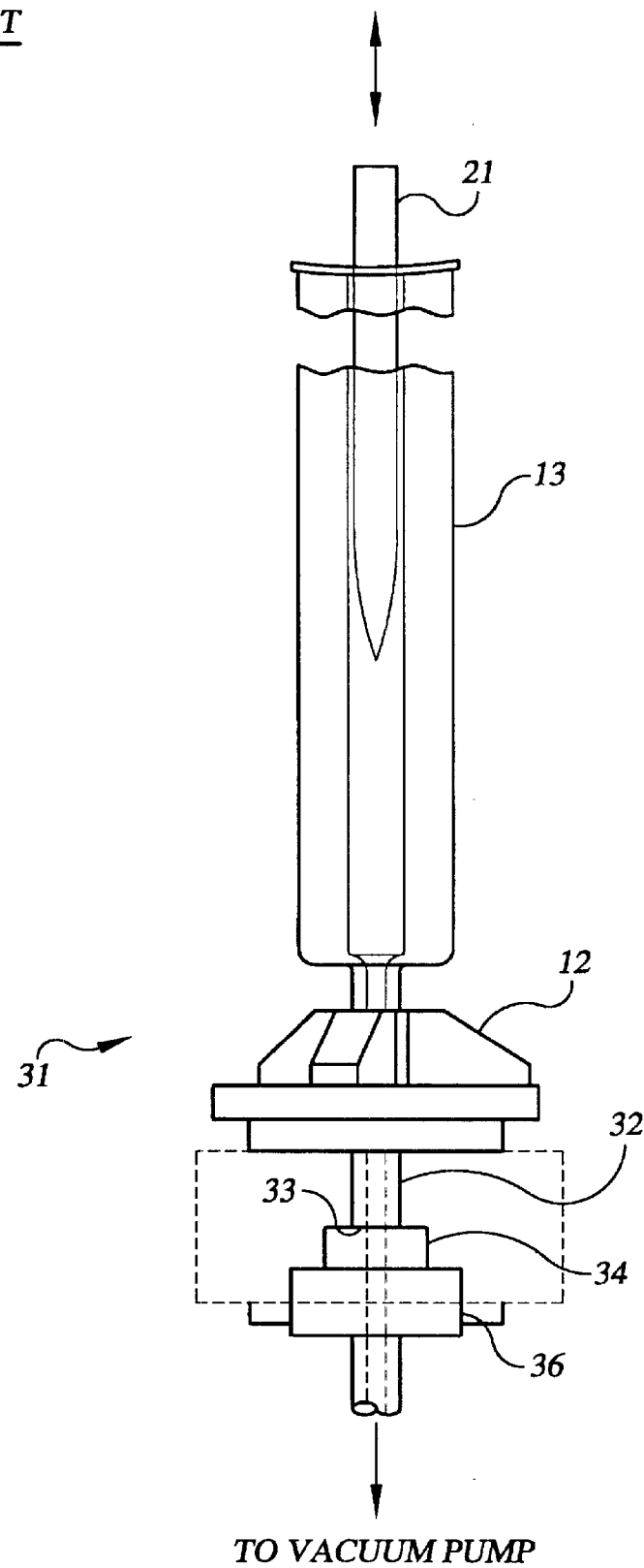
FIG. 2 is an elevational view of a prior art overcladding apparatus for use with the arrangement of FIG. 1, for example.

In FIG. 2 there is shown a variation of the arrangement of FIG. 1 wherein a tailstock arrangement 31 is modified to enable the tube 13 to be hermetically sealed for facilitating creation of the low pressure region, as is shown in U.S. Pat. No. 5,578,106 of Fleming, Jr., et al., the disclosure of which is incorporated herein by reference. In the arrangement of FIG. 2, tube 13 has a neckdown portion 32, the end 33 of which forms a hermetic or vacuum seal within a gasket or washer 34. A concentric channel extends via a rotary union member 36 and washer 34 to the interior of the tube 13, thereby placing the tube interior in communication with a vacuum pump, as depicted in FIG. 1. As discussed hereinbefore, such a sealing arrangement, once assembled, does not permit axial movement of the tube 13.

Figure 3:
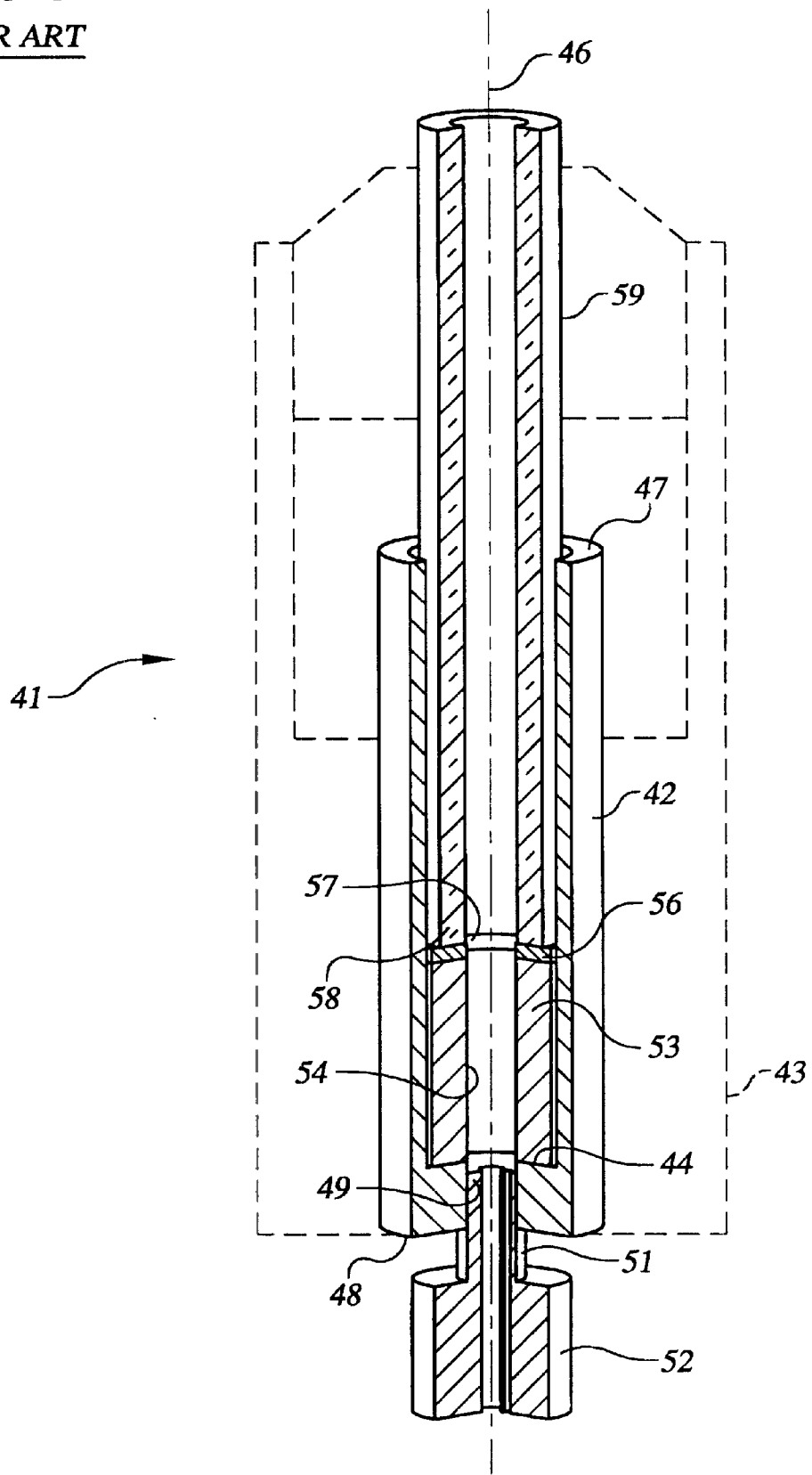
FIG. 3 is a partially perspective, partially cutaway view of a vacuum apparatus in use in present day productions.

FIG. 3 is a partially perspective view in cross-section of a preferred RIT arrangement 41 in wide use today. The apparatus 41 comprises a circular cavity member 42 mounted concentrically within a chuck 43 (shown in dashed lines) with the interior floor or bottom 44 of the cavity 42 being perpendicular to the axis of rotation 46. The top 47 of cavity member 42 is open to the atmosphere, and the closed end 48 has an axial bore 49 therein in which is mounted the hollow spindle 51 of a rotary union member 52. A rotary union member has a bore extending through a stationary portion and a rotating portion without leakage, or with the minimum amount of leakage. Such devices are widely available commercially. A vacuum structure (not shown) is linked to the interior of the cavity member 42 through the bore in rotary union member 52, with the vacuum structure itself being stationary with respect to the lathe while, in use, the cavity member 42 is rotating.

A cylindrical insert or spacer 53, having a bore 54 therethrough and a diameter roughly equal to the interior diameter of the cavity member 42 is carried within member 42 and rests upon the floor 44 thereof. The top of spacer 53 is parallel to the floor 44 and has a washer or gasket 56 of suitable material, such as a refractory material, having a central bore 57 therein. The end 58 of an overclad tube 59, after being prepared is inserted into cavity member 42 and rests upon the top surface of washer member 56, forming, by its own weight, a seal therewith. Thus, the bottom end of spacer 53 forms a seal with the floor 44 of the cavity member 42 and the end 58 of tube 59 forms a seal with the top surface of washer 56. The seals thus formed are not perfect, and some leakage may be expected. However, the vacuum apparatus is made to communicate with the interior of tube 59 through a substantially, even if not completely, sealed passage. Once the tube 59 is in position, the jaws of chuck are closed to grip and clamp it rotationally and axially. Rotation of tube 59 is then realized through rotation of the chuck, but the tube 59 may not be moved axially, as discussed hereinbefore, without breaking the seal or seals. Longitudinal or axial positioning of the tube 59 also depends upon the length of spacer member 53 hence, different lengths of the spacer must be used for different longitudinal positioning of the tube 59.

Figure 4:
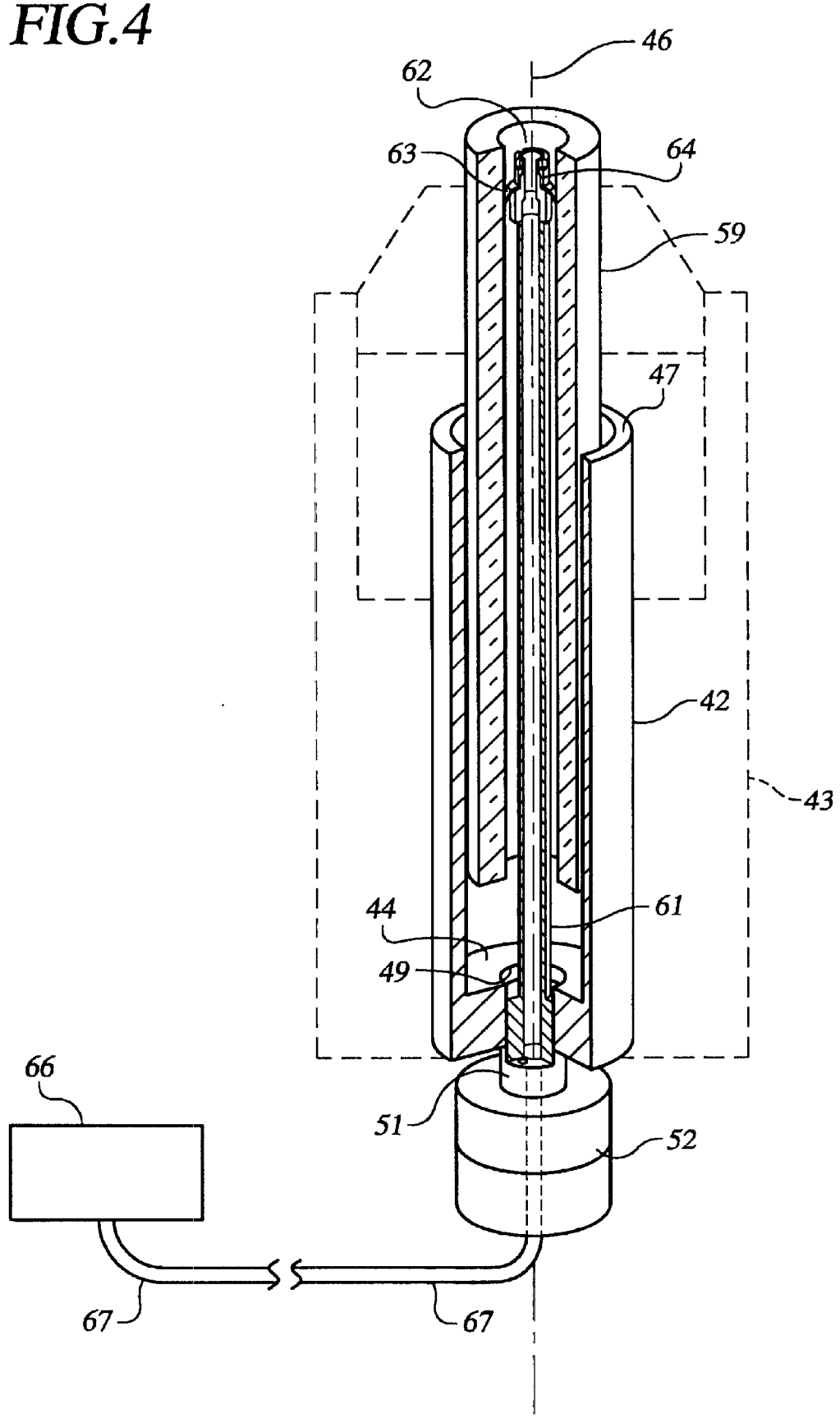
FIG. 4 is a partially perspective, partially cutaway view of the vacuum sealing arrangement of the present invention.

The present invention, as pointed out in the foregoing, eliminates the dependency upon the several sealing interfaces noted in the discussion of the prior art embodiment of FIG. 3, and, further, makes axial adjustment of the overclad tube relative to the rod feasible by maintaining the sealed condition even during such adjustment. In FIG. 4 there is shown a preferred embodiment of the present invention which includes several components in common with the arrangement of FIG. 3. As a consequence, like parts in FIGS. 3 and 4 bear the same reference numerals. It is to be understood that the principles of the invention as illustrated in FIGS. 4 et. seq. are applicable to other overcladding arrangements in which maintenance of a vacuum seal during movement of the components is desired, that shown in FIG. 4 representing a preferred but not exclusive embodiment of these principles.

In the arrangement 60 of FIG. 4, circular cavity member 42 has an axial bore 49 into which the hollow spindle 51 of rotary union member 52 is inserted and held. Spindle 51 has an elongated hollow extension member 61 which may be integral with spindle 51 or may be mounted therein. Rotary union member 52, spindle 51, and extension 61 are made of suitable material such as, for example, stainless steel. Overclad tube 59 is inserted into cavity member 42 and is held therein by the chuck 43. Extension member 61 extends into overclad tube 59 for a portion of its length as shown. On the distal end 62 of extension 61 is a disposable sealing member 63 of suitable material, such as, for example, Teflon® or rubber, which is a sealing fit within the internal diameter (ID) of tube 59. Member 63 preferably has a conical, tapered or cup shaped configuration which, or will be discussed hereinafter, aids in establishing a viable seal. Member 63 is held in place by a hub interface member 64 which is fitted onto the distal end 62, and is removable or replaceable. Any of a number of mounting means for removably mounting sealing member 63 on distal end 62 may be used, that shown in FIG. 4 being by way of example only. It is desirable that sealing member 63 be easily replaceable inasmuch as some wear and hence deterioration of the seal is to be expected. Also, replaceable seals make possible the use of overclad tubes having differing IDs. In the arrangement 60 of FIG. 4, a vacuum source 66 is shown connected to a rotary union member 52 by a suitable conduit 67, for creating a vacuum or low pressure area within tube 59 above (as seen in FIG. 4) the sealing member 63. Thus, no matter where sealing member 63 is axially located within tube 59, that portion of the tube interior above sealing member 63 (as shown in the drawing) will be, during operation, at a low pressure approaching a vacuum. When it is necessary to move the tube 59 or to bring more of tube 59 within the range of vertical travel of the torch, it is only necessary to loosen chuck 43 to allow repositioning of the tube 59 and then retighten it. The seal between sealing member 63 and the inner wall of tube 59 remains intact. The overclad tube used in production of the preforms generally have a uniform ID, thus member 63 maintains its sealing action whenever tube 59 is moved axially with respect thereto, thereby reducing interruptions of the process (to move the tube) to a minimum elapsed time.

The rotary union member 52 is such that it permits, in the case of a tightly fitting sealing member 63, transmission of the tube rotation thereto without slippage. On the other hand, in the case of a less tight seal by sealing member 63, the tube 59 can rotate with respect thereto, and the rotary union member does not rotate. In either of these extremes, the sealing integrity is maintained. Thus a wide variation in the tightness of the fit of sealing member 63 can be accommodated by means of the rotary union member 52.

As pointed out hereinbefore, sealing member 63 is replaceable, being mounted on the distal end 62 of extension 61 of the spindle 51 in a manner such that replacement can be quickly accomplished. FIGS. 5 and 6 depict two possible mounting schemes, although it is to be understood that numerous different types of replaceable mounting schemes might readily be used, such arrangements being within the purview of one skilled in the art. In FIG. 5, extension 61, which has bore 71 extending therethrough has, near its distal end 62, a groove 72 extending circumferentially thereof. Conical shaped sealing member 63 has a cylindrical portion 73 extending rearwardly thereof having a bore 74 which extends therethrough and through member 63. Near the distal end of portion 73 on the interior wall of bore 74 is a raised circular ring 76 which is adapted to fit within groove 72 of extension 61 so that sealing member 63 may be snapped on to the distal end 62 of extension 61 and held by ring 76 riding in groove 72. When replacement of member 63 is desired, it may be pulled off by overcoming the hold exerted by ring 76 in groove 72. The tapered, conical, or cup shape of member 63 facilitates the sealing action inasmuch as the air pressure, as shown by the arrow P, forces the member 63 more tightly against the interior wall of tube 59. Thus the sealing effect of member 63 increases with increased pressure differential between the low pressure side and the atmospheric or high pressure side. In FIG. 6, the bore 71 has a threaded portion 77 extending from distal end 62 which is adapted to receive the threaded portion 78 of a bolt 79 which has a bore 81 extended therethrough. The vacuum system thus communicates with the interior of tube 59 through the bore 81 in bolt 79, and the head of the bolt holds member 63 firmly on the distal end of extension 61.

From the foregoing it can readily be seen that the present invention provides vacuum sealing of a portion of the interior of the overclad tube which, at the same time permitting axial adjustment or movement of the tube without compromising the vacuum seal.

From the foregoing detailed description, it should be noted that it will be obvious to those skilled in the art that many variations and modifications maybe made to the preferred embodiment without substantial departure from the principles of the present invention. All such variations and modifications are intended to be included herein as being within the scope of the present invention, as set forth in the following claims. Further, in the claims hereafter, the corresponding structures, materials, acts and equivalents of all means or step plus function elements are intended to include any structure, material, or acts for performing the functions with other claimed elements as specifically claimed.

What is claimed is:

1. A vacuum sealing apparatus for creating a movable seal with a rotatable overclad tube for creation of a low pressure region therein, wherein the rotatable overclad tube is axially movable in relation to the movable seal, said apparatus comprising:

a longitudinal hollow tubular member for insertion into the rotatable overclad tube, said longitudinal hollow tubular member having a distal end which is within the rotatable overclad tube during operation;

a sealing member mounted on said distal end, said sealing member having an outer diameter that is a sealing fit within the rotatable overclad tube and having an opening therein communicating with the interior of the longitudinal hollow tubular member, said longitudinal hollow tubular member having a proximal end spaced from said distal end and adapted to be connected to a vacuum source.

2. A vacuum sealing apparatus as claimed in claim 1, wherein said proximal end is connected to a rotary union member having a bore extending therethrough which is adapted to be connected to the vacuum source.

3. A vacuum sealing apparatus as claimed in claim 1, wherein said sealing member is removably mounted on said distal end.

4. A vacuum sealing apparatus as claimed in claim 1, wherein said sealing member comprises a conically shaped member of a resilient material.

5. A vacuum sealing apparatus as claimed in claim 4 wherein said resilient material is a polymer of polytetrafluoroethylene.

6. A vacuum sealing apparatus as claimed in claim 4, wherein said resilient material is rubber.

7. In an apparatus for collapsing a hollow glass tube upon a glass rod, wherein the hollow glass tube and the glass rod are rotatably mounted along a longitudinal axis and are axially movable with respect to each other, a vacuum apparatus for producing a low pressure region within the hollow glass tube, said vacuum apparatus comprising:

a rotary union member having a bore extending therethrough;

a tubular member extending axially from said rotary union member and having a bore therein communicating with the bore in said rotary union member, said tubular member having a distal end;

a sealing member mounted on said distal end, said sealing member having an outer diameter that is a sealing fit within the hollow glass tube, said sealing member having a bore therethrough communicating with the bore in said tubular member; and a vacuum source communicating with said bore in said rotary union member.

8. A vacuum apparatus as claimed in claim 7, wherein said sealing member is removably mounted on said distal end.

9. A vacuum apparatus as claimed in claim 7, wherein said sealing member is made of a resilient material.

10. A vacuum apparatus as claimed in claim 9, wherein said material is a polymer of polytetrafluoroethylene.

11. A vacuum apparatus as claimed in claim 9, wherein said material is rubber.

12. A vacuum apparatus as claimed in claim 7, wherein said sealing member is conical in shape and tapers toward said distal end.

* * * * *